United States Patent
Conny

(10) Patent No.: US 9,371,097 B1
(45) Date of Patent: Jun. 21, 2016

(54) AERODYNAMIC DEVICE FOR THE REAR OF A TRAILER

(71) Applicant: Trailstar International, Inc., Alliance, OH (US)

(72) Inventor: Michael A. Conny, Beloit, OH (US)

(73) Assignee: Trailstar International, Inc., Alliance, OH (US)

( * ) Notice: Subject to any disclaimer, the term of this patent is extended or adjusted under 35 U.S.C. 154(b) by 0 days.

(21) Appl. No.: 14/605,508

(22) Filed: Jan. 26, 2015

(51) Int. Cl.
*B62D 35/00* (2006.01)
*B60H 1/30* (2006.01)

(52) U.S. Cl.
CPC .............. *B62D 35/004* (2013.01); *B60H 1/30* (2013.01)

(58) Field of Classification Search
CPC ................................ B62D 35/004; B60H 1/30
USPC ......................................................... 296/180.4
See application file for complete search history.

(56) References Cited

U.S. PATENT DOCUMENTS

| | | | |
|---|---|---|---|
| 3,834,752 A | 9/1974 | Cook | |
| 4,006,932 A | 2/1977 | McDonald | |
| 4,688,841 A | 8/1987 | Moore | |
| 4,741,569 A | 5/1988 | Sutphen | |
| 4,978,162 A * | 12/1990 | Labbe | B62D 35/004 296/180.2 |
| 5,823,610 A | 10/1998 | Ryan et al. | |
| 6,286,894 B1 | 9/2001 | Kingham | |
| 6,409,252 B1 | 6/2002 | Andrus | |
| 6,457,766 B1 | 10/2002 | Telnack | |
| 6,666,498 B1 | 12/2003 | Whitten | |
| 6,685,256 B1 * | 2/2004 | Shermer | B60J 5/108 296/180.1 |
| 6,789,839 B1 | 9/2004 | Samuelson | |
| 7,243,980 B2 | 7/2007 | Vala | |
| 7,866,734 B2 | 1/2011 | Mracek | |
| 8,025,329 B1 | 9/2011 | Kron | |
| 8,287,030 B2 | 10/2012 | Ryan et al. | |
| 8,444,210 B2 | 5/2013 | Domo et al. | |
| 8,550,539 B1 | 10/2013 | Anderson | |
| 8,573,680 B2 | 11/2013 | Smith | |
| 8,622,462 B2 | 1/2014 | Ryan et al. | |
| 2003/0132644 A1 | 7/2003 | Crews | |
| 2010/0181799 A1 * | 7/2010 | Ryan | B62D 35/004 296/180.4 |

FOREIGN PATENT DOCUMENTS

WO 2013182618 12/2013

OTHER PUBLICATIONS http://www.ats-green.com/smarttail.htm, ATS Aerodynamic Trailer Systems, LLC, Smarttail the trucking industry's first totally automated trailer air spoiler, 3 pages. Document is undated but the document was printed from the pertinent website on Jan. 16, 2015.

\* cited by examiner

*Primary Examiner* — Joseph D Pape
(74) *Attorney, Agent, or Firm* — Sand & Sebolt

(57) ABSTRACT

An aerodynamic device for a trailer includes an inflatable member coupled to a rear wall on a trailer adapted to inflate rearwardly therefrom to reduce drag as the trailer is towed forwardly. The aerodynamic device further includes an air intake scoop mounted beneath the rear wall of the trailer in fluid communication the inflatable member for filling the inflatable member with air as the trailer moves forward.

19 Claims, 3 Drawing Sheets

AERODYNAMIC DEVICE FOR THE REAR OF A TRAILER

BACKGROUND OF THE INVENTION

1. Technical Field

The present invention relates generally to the field of aerodynamic devices to reduce drag. More particularly, the present invention relates to an aerodynamic device that is adapted to extend from the back of a trailer or semi-trailer container. Specifically, the present invention relates to an air intake scoop and an inflatable member extending outwardly rearward from a trailer.

2. Background Information

A semi-tractor trailer-truck has advantages over a personal small pick-up truck in that it can carry much larger cargo. One disadvantage, however, is that there is a large profile of the truck as it moves forward that increases the aerodynamic drag of the tractor-trailer combination compared to a smaller vehicle. The large profile causes a large drag on the truck thereby greatly reducing the fuel economy thereof.

It has been estimated that almost 65% of the fuel burned by tractor-trailers is to overcome aerodynamic drag. As a result, even a small reduction in aerodynamic drag may have a significant impact on the amount of fuel consumed. Additionally by consuming less fuel, trucking companies reduce cost, which they may pass along to the consumers. Many attempts have been made to reduce the aerodynamic drag of tractor-trailers. Generally, these attempts are directed to drag created by the motion of the tractor-trailer rigs through the ambient air stream. For example, sloped tops, side extender fairings, and side skirt bottoms have been added to the tractors.

Some exemplary drag reducing devices are depicted in U.S. Pat. Nos. 4,006,932; 4,688,841; 4,741,569; 5,823,610; 6,409,252; 6,457,766; 6,789,839; 7,243,980; 7,866,734; 8,287,030; 8,444,210; 8,550,539; and 8,622,462.

SUMMARY

Issues continue to exist with these known aerodynamic devices because most require complex inflation means, such as the need for a pump. While U.S. Pat. No. 6,409,252 appears to address the need for a simple inflation mechanism inasmuch as it discloses an air scoop extending upwardly beyond the top of the trailer; it appears that this device would cause other concerns such as adding height to the overall unit, which may be precluded by state transportation laws. The present invention addresses the need for a drag reducing aerodynamic device in a more simple way that currently known, as well as other issues.

In accordance with one aspect of the invention, an embodiment invention may provide an aerodynamic device for a trailer comprising: an inflatable member coupled to a rear wall on a trailer, adapted to inflate rearwardly therefrom to reduce drag as the trailer is towed forwardly; and an air intake scoop mounted beneath the rear wall in fluid communication with inflatable member for filling the inflatable member with air as the trailer moves forward.

In yet another aspect, an embodiment of the invention may provide an air intake scoop mounted beneath a trailer adjacent a rear bumper to inflate a drag reducing inflatable member as the trailer moves forward through the air stream, the intake scoop comprising: an inlet allowing airflow therethrough as the trailer moves forward, said inlet aligned generally vertical when viewed from the side; and an outlet allowing airflow therefrom as the trailer moves forward, said outlet aligned generally horizontal, when viewed from the side, to guide air upwardly as air leaves the outlet.

Another aspect of an embodiment of the invention may provide a method of inflating an aerodynamic device comprising the steps of mounting an air intake scoop beneath a trailer towed by a vehicle, the scoop in fluid communication with an inflatable member coupled to the rear wall of the trailer and moving air through the intake scoop and into the inflatable member.

BRIEF DESCRIPTION OF THE SEVERAL VIEWS OF THE DRAWINGS

A sample embodiment of the invention, is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
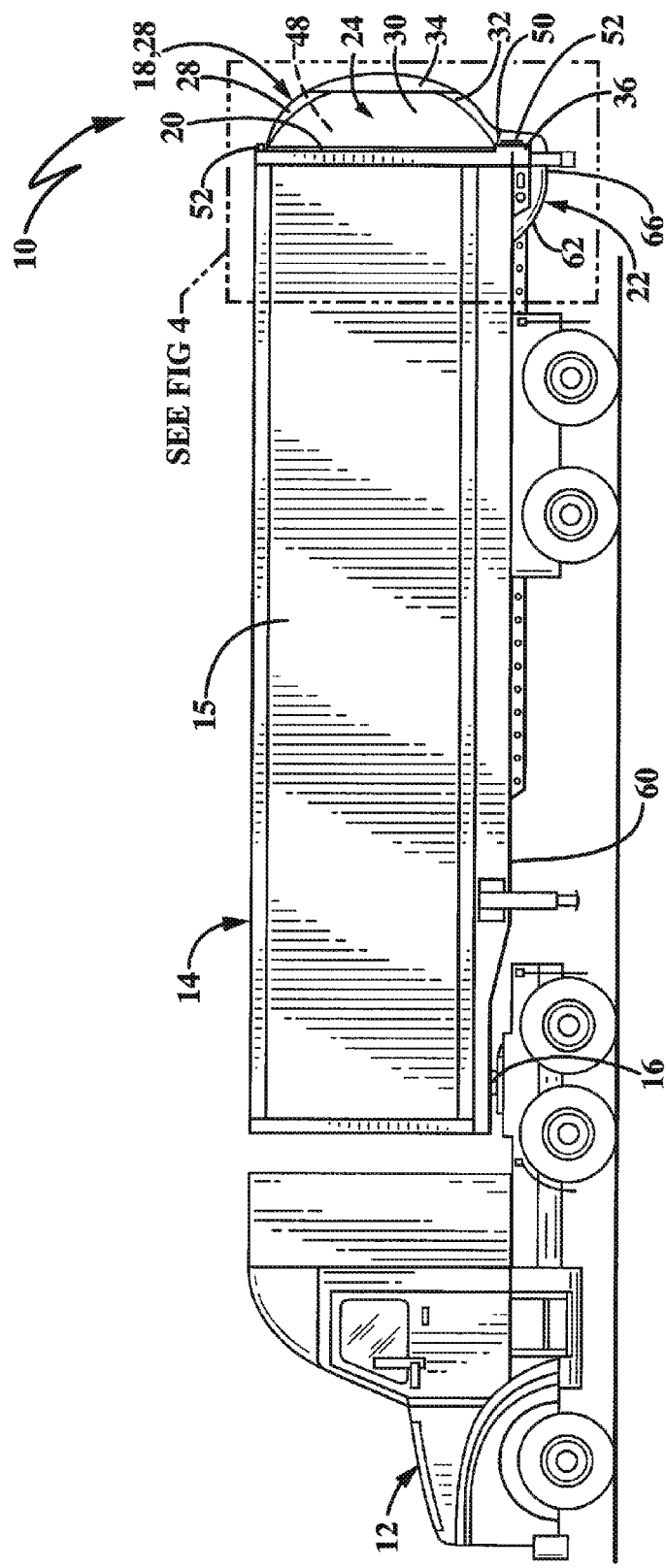
FIG. 1 is a side view of an aerodynamic device of the present invention mounted to the rear of a trailer.

The new inflatable aerodynamic device or wind dam of the present invention depicted throughout FIGS. 1-4 is indicated generally as 10. As depicted in FIG. 1, aerodynamic device 10 reduces drag forces ordinarily imparted to a vehicle or truck 12 as truck 12 is hauling a storage area 15 in a box trailer 14 via a fifth-wheel 16. Fifth wheel 16 is located adjacent the ground engaging drive wheels. An aerodynamic device 10 for a trailer includes an inflatable member 18 coupled to a rear wall 20 on the box trailer 14 adapted to inflate rearwardly therefrom to reduce drag as the trailer is towed forwardly. Device 10 further includes an air intake scoop 22 mounted beneath the rear wall 20 in fluid communication with the inflatable member 18 for filling the inflatable member with air as the box trailer 14 moves forward.

Figure 2:
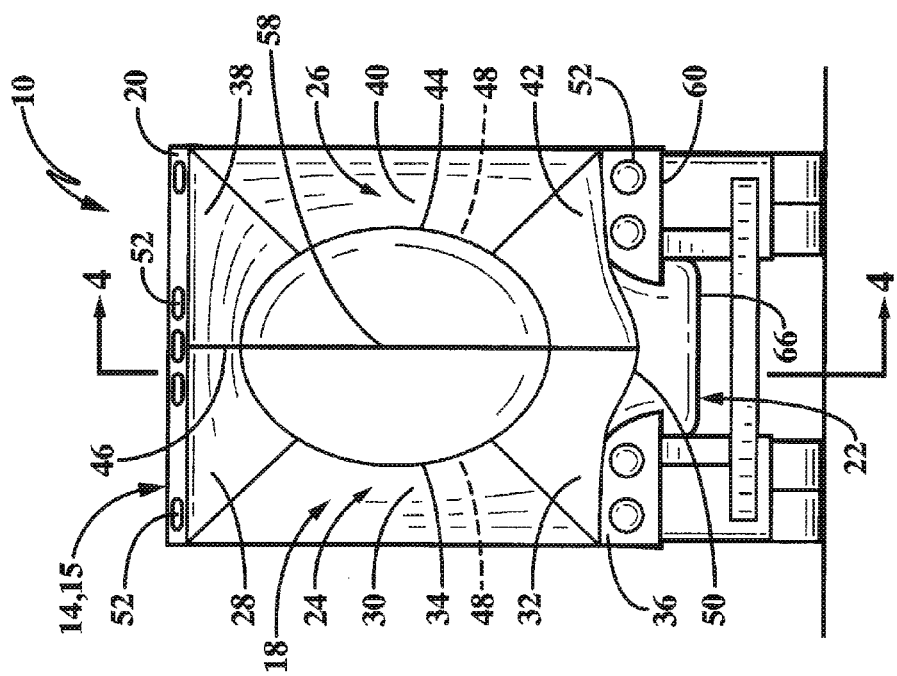
FIG. 2 is a rear view of the aerodynamic device of the present invention.

As depicted in FIG. 2, inflatable member 18 includes a left section 24 and a right section 26. Left section 24 includes a top wall 28, a side wall 30, a bottom wall 32, and a tail wall 34. The top wall 28 is coupled adjacent the top of the trailer box 14 at the rear wall 20. The side wall 30 is coupled adjacent the left vertical edge adjacent the rear wall 20. The bottom wall 32 is coupled adjacent the bumper 36 of the box trailer 14. The tail wall 34 is coupled to each of the top, side, and bottom walls 28, 30, 32 and extends rearwardly therefrom to create a portion of a tail structure. Similar to the left section 24, right section 26 includes a top wall 38, a side wall 40, a bottom wall 42, and a tail wall 44 coupled to the right side adjacent the rear wall 20 of the box trailer 14 in a complimentary manner as described above. Left and right sections 24, 26 may attach together along a center line 46 via a releasably securing member, such as a zipper or conventional hook and loop closures.

With continued reference to FIG. 2, inflatable member 18 defines an air chamber 48 therein to retain air as the box trailer 14 moves forward and air is moved through air intake scoop 22. Air chamber 48 is bound by the flexible walls of left and right sections 24, 26 described above. Inner air chamber 48 may include left and right sections respectively defined by the flexible left and right sections 24, 26 on inflatable member 18. However, in one alternative embodiment, inflatable member 18 is a unified member defining only a single air chamber 48.

The left section 24 is a first flexible curvilinear wall partially defining a portion of air chamber 48. A forward end on the left section 24 is generally coplanar with a longitudinally extending left or first container sidewall on the box trailer 14. Left section 24 arcuately extends in a curvilinear manner toward midline 46 on the box trailer 14. The right section 26 is a second flexible curvilinear wall spaced apart oppositely and complementary to the first curvilinear wall of the left section 24. The right section 26 partially defining a portion of air chamber 48. A forward end on the second curvilinear wall of the right section 26 is generally coplanar with a right or second container sidewall on the box trailer 14. The curvilinear wall of right section 26 extends arcuately toward the midline 46 on the box trailer 14.

In one particular embodiment of the aerodynamic device 10, a union 50 couples the inflatable member 18 to the air intake scoop 22 in a location adjacent the bumper 36 of the box trailer 14, yet still allows the taillights 52 formed in the bumper 36 to be visible when viewed from the rear as depicted in FIG. 2. Union 50 permits fluid communication of air moving upwardly from and through intake scoop 22 into inflatable member 18.

Figure 3:
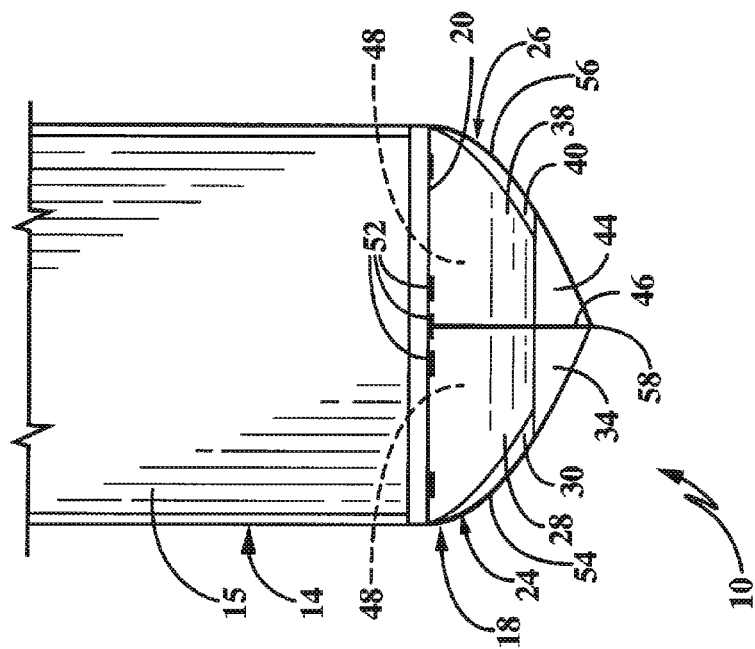
FIG. 3 is a top view of the aerodynamic device of the present invention.

As depicted in the top view of FIG. 3, when inflatable member 18 is in the inflated position, inflatable member 18 of aerodynamic device 10 has a generally hemispheric shape with slight tail to produce an aerodynamic effect as trailer 14 moves forwardly through the airstream. Tail shape on inflatable member 18 includes tail wall of left section 54 and tail wall of right section 56 joined together along the center line 46 of the trailer. The tear-drop tail shape of the tail ends at a tip 58 located at the rearmost end of inflatable member.

Figure 4:
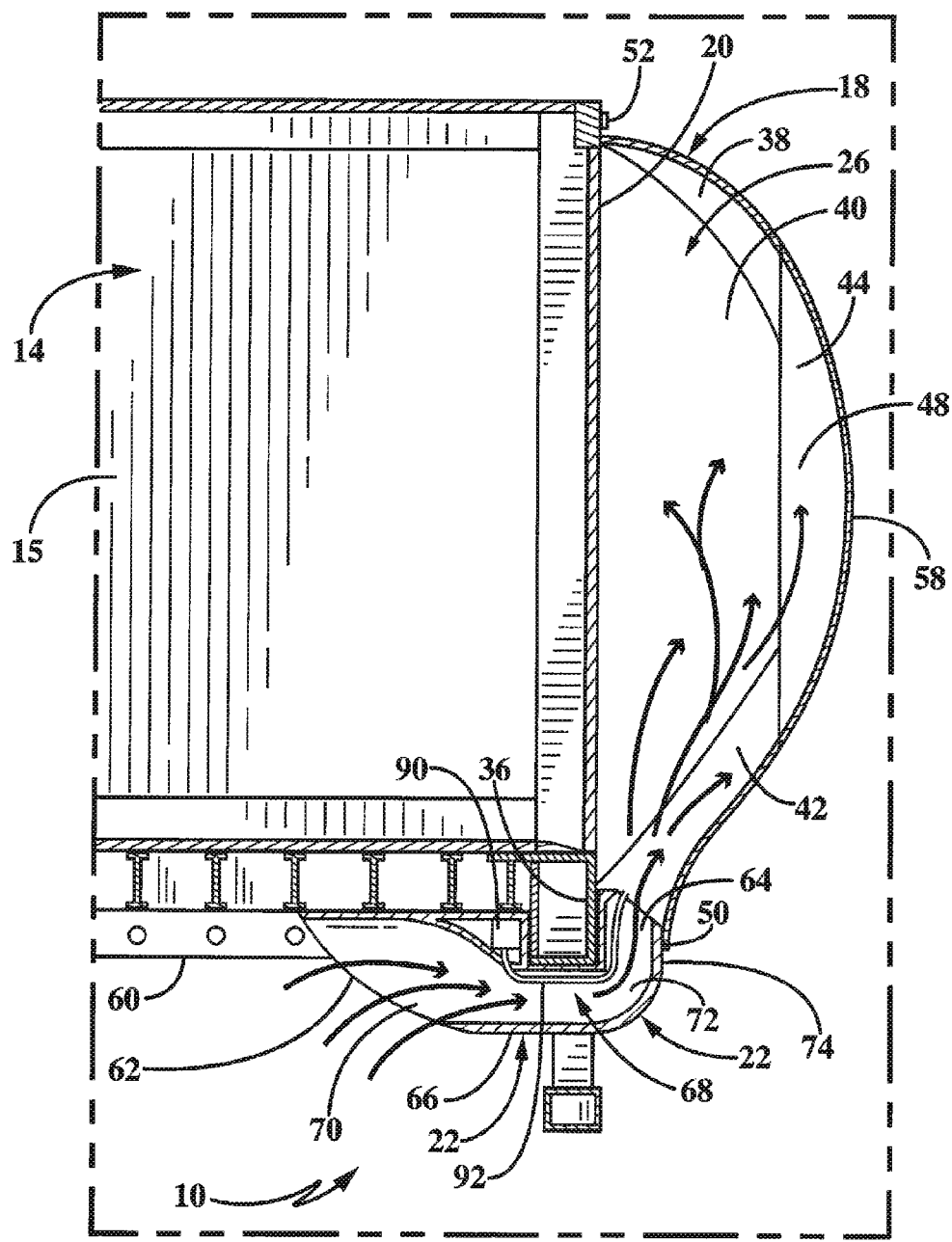
FIG. 4 is a cross section view of the aerodynamic device taken along line 4-4 in FIG. 2.

As depicted in FIG. 4, the air intake scoop 22 is mounted beneath the bottom 60 of the trailer 14. The air intake scoop 22 forms and defines an inlet 62 and an outlet 64, permitting air to flow therethrough. The inlet 62 is positioned forwardly from the bumper 36 and in one particular embodiment, the outlet 64 is positioned rearwardly from the bumper 36 where it meets the inflatable member at the union 50. Air scoop 22 includes a first or bottom wall 66 that defines a portion of the air passageway 68 extending between the inlet 62 and the outlet 64. The bottom wall 66 has a generally smooth aerodynamic profile extending from the inlet 62 forward of the bumper 36 to the outlet 64 rearward of the bumper 36.

In one particular embodiment, air passageway 68 defined by the bottom wall 66 is generally L-shaped in cross section, such that a first leg 70 of the L-shaped passageway is generally aligned longitudinal with the bottom 60 of the trailer 14 and a second leg 72 of the L-shaped passageway 68 is generally aligned vertical with the rear wall 20 of the trailer 14.

The inlet 62 is shaped in a manner that encourages air flow to enter as the truck moves the trailer forward. Air scoop 22 further includes a generally vertical back wall 74 connected to the air scoop bottom wall 66 to urge air upwardly into the inflatable member through the union 50 as the trailer moves forward. In one particular embodiment the back wall 74 may be coupled to the inflatable member 18 and configured to either expose or provide an unhindered sight line to the brake lights 52. In one particular embodiment, the inlet 62 is aligned generally vertical when viewed from the side and the outlet 64 allowing airflow therefrom as the trailer moves forward is aligned generally horizontal when viewed from the side to guide air upwardly as air leaves the outlet.

In accordance with one aspect of an embodiment, aerodynamic device 10 is configured to decrease drag on the towed trailer by inflating when air is moving through the intake scoop 22 as the truck 12 pulls trailer 14 forward. In accordance with another aspect of the present invention, inflatable member 18 of the aerodynamic device is in fluid communication with the air intake scoop 22 mounted lower than the rear wall 20 of the trailer 14 permitting air to flow underneath the underbody of the trailer 14 to inflate said inflatable member 18. One exemplary non-limiting advantage of the air intake scoop 22 location mounted beneath the rear wall 20 is that often commercial vehicles, such as tractor-trailers, have maximum height limitations imposed by state laws or regulations, thus adding an air scoop extending upwardly above the rear wall of the trailer may cause the operator to be in violation of the law or require a special shipping permit.

In operation, the aerodynamic device 10 is generally inflated by first mounting the air intake scoop 22 beneath the trailer 14, such that the air scoop inlet 62 faces forwardly and the scoop 22 is in fluid communication with the inflatable member 18 that is coupled to the rear wall 20 of the trailer 14. In one particular embodiment, a user may selectively set the intake area to desired size to permit a desired flow rate passing through the air scoop. This may allow the inflatable member to inflate at one speed while not at others.

The truck 12 tows the trailer 14 in a forward direction. Air flows into the air intake scoop inlet 62 all the way through the passageway 68 and out the outlet 64. Air flows from the outlet 64 upwardly into the chamber 48 defined by the respective left and right sections 24, 26 to inflate the inflatable member 18. As the trailer 14 begins to slow, air pressure may deflate the inflatable member 18 by moving air from within the chamber 48 outwardly through the air intake scoop 22 opposite the direction that of the way the air entered.

In one alternative embodiment, inlet 62 on scoop 22 may be selectively operable to vary the diameter of the inlet as the truck 12 tows trailer 14 forwardly. Further, a closeable inlet 62 may be provided on the air intake scoop 22, and an air compressor 90 may be mounted to the trailer for inflating the inflatable member via line 92 when the inlet is closed. Additionally, some embodiments may be free of compressor 90 and line 92 may be connected to a second air compressor on box trailer 14 operatively connected to the brake system.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. An aerodynamic device for a trailer comprising:
   an inflatable member coupled to a rear wall on a trailer adapted to inflate rearwardly therefrom to reduce drag as the trailer is towed forwardly, wherein the inflatable member includes two complementary inflatable sections having a generally hemispheric shape in an inflated position when viewed from above, and the two sections meeting at a rearmost teardrop shaped tip at the midline of the trailer;

an air intake scoop mounted to the trailer beneath the rear wall and in fluid communication with the inflatable member for filling the inflatable member with air as the trailer moves forward; and wherein the air intake scoop includes a single inlet and a single outlet.

2. The aerodynamic device of claim 1, further comprising:
wherein the single inlet faces the forward direction of trailer movement; and
wherein the single outlet faces a direction different than that of the inlet;
wherein each the inlet and outlet permit air to flow therethrough.

3. The aerodynamic device of claim 1, the air intake scoop comprising:
a longitudinally extending first wall below a bottom wall on the trailer having a forward end terminating rearwardly from a set of rear tires on the trailer;
an air passageway defined between first wall and the bottom wall on the trailer; and
wherein the single outlet is coupled to an air inlet on the inflatable member.

4. The aerodynamic device of claim 1, the air intake scoop comprising:
a generally vertical back wall connected to a longitudinally extending first wall below a bottom wall on the trailer, wherein the back wall urges air upwardly into the inflatable member as the trailer moves forward.

5. The aerodynamic device of claim 1, the air intake scoop comprising:
a back wall for guiding air into the inflatable member coupled to the trailer and configured to expose a set of brake lights on the trailer.

6. The aerodynamic device of claim 1, further comprising:
a union coupling an inlet to the inflatable member coupled to an outlet on the air intake scoop; and
said union positioned adjacent a bumper on the trailer including an unhindered sightline to a set of taillights on the bumper when viewed from the rear.

7. The aerodynamic device of claim 2, wherein the single outlet is horizontally aligned to direct moving air upwardly into the inflatable member, and the single outlet positioned entirely between taillights on the trailer.

8. The aerodynamic device of claim 1, wherein the air intake scoop is entirely between a set of rear wheels on the trailer.

9. The aerodynamic device of claim 1, wherein the single inlet on the air intake scoop is disposed rearwardly from a set of rear wheels on the trailer.

10. An air intake scoop mounted beneath a trailer adjacent a rear bumper to inflate a drag reducing inflatable member as the trailer moves forward through the air stream, wherein the inflatable member includes two complementary inflatable sections having a generally hemispheric shape in an inflated position when viewed from above, and the two sections meeting at a rearmost teardrop shaped tip at the midline of the trailer, the intake scoop comprising:
an inlet allowing airflow therethrough as the trailer moves forward, said inlet aligned generally vertical and said inlet positioned entirely rearward from a set of rear tires on the trailer when viewed from the side, and said inlet positioned entirely between the set of rear tires when viewed from the rear; and an outlet allowing airflow therefrom as the trailer moves forward, said outlet aligned generally horizontal, when viewed from the side, to guide air upwardly as air leaves the outlet.

11. The air intake scoop of claim 10, further comprising:
a generally L-shaped air passageway defined by a first leg generally aligned longitudinal with a bottom of the trailer and a second leg generally aligned vertical with a rear wall on the trailer.

12. The air intake scoop of claim 10, further comprising:
a first wall including a generally smooth aerodynamic profile extending from a first end forward of the bumper to the a second end rearward of the bumper.

13. The air intake scoop of claim 10, wherein the outlet is positioned adjacent the bumper of the trailer permitting a set of taillights formed in the bumper to be visible when viewed from the rear.

14. The air intake scoop of claim 10, further comprising:
a generally vertical back wall configured to guide air upwardly into a chamber in the inflatable member as the trailer moves forward.

15. A method of inflating an aerodynamic device comprising the steps of:
mounting an air intake scoop beneath a trailer towed by a vehicle, the air intake scoop positioned rearward from a set of rear trailer wheels the scoop in fluid communication with an inflatable member coupled to the rear wall of the trailer; and
moving air through the intake scoop and into the inflatable member, wherein the inflatable member includes two complementary inflatable sections having a generally hemispheric shape in an inflated position when viewed from above, and the two sections meeting at a rearmost teardrop shaped tip at the midline of the trailer.

16. The method of claim 15, wherein the step of moving air through the intake scoop is accomplished by moving the trailer forward causing air to flow into an inlet on the air intake scoop.

17. The method of claim 15, further comprising the step of:
deflating the inflatable member by moving air from within the inflatable member outwardly through the air intake scoop.

18. An aerodynamic device for a trailer comprising:
an inflatable member coupled to a rear wall on a trailer adapted to inflate rearwardly therefrom to reduce drag as the trailer is towed forwardly, wherein the inflatable member includes two complementary inflatable sections having a generally hemispheric shape in an inflated position when viewed from above, and the two sections meeting at a rearmost teardrop shaped tip at the midline of the trailer;
an air intake scoop mounted to the trailer beneath the rear wall and in fluid communication with the inflatable member for filling the inflatable member with air as the trailer moves forward; and
wherein the air intake scoop includes a single inlet and a single outlet.
a first flexible curvilinear wall partially defining a first air chamber;
a forward end on the first curvilinear wall generally coplanar with a first sidewall on the trailer, and the curvilinear wall arcuately extending toward a midline on the trailer; and
a rearmost teardrop shaped tip at the midline of the trailer configured to reduce drag when the inflatable member is fully inflated.

19. The aerodynamic device of claim 18, further comprising:
- a second flexible curvilinear wall spaced apart oppositely and complementary to the first curvilinear wall, the second wall partially defining a second air chamber; and
- a forward end on the second curvilinear wall generally coplanar with a second sidewall on the trailer spaced apart and parallel to the first sidewall, and the curvilinear wall arcuately extending toward the rearmost teardrop shaped tip at the midline of the trailer.

* * * * *